United States Patent
Chang et al.

(10) Patent No.: US 10,871,502 B2
(45) Date of Patent: Dec. 22, 2020

(54) ROTATING THREE-DIMENSIONAL ULTRASONIC ANEMOMETER AND METHOD OF MEASURING THREE-DIMENSIONAL WIND VELOCITY USING THE SAME

(71) Applicant: KOREA AEROSPACE RESEARCH INSTITUTE, Daejeon (KR)

(72) Inventors: Byeong Hee Chang, Daejeon (KR); Seunghoon Lee, Daejeon (KR); Tae Hwan Cho, Daejeon (KR); Yang Won Kim, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 182 days.

(21) Appl. No.: 16/315,564

(22) PCT Filed: Apr. 23, 2018

(86) PCT No.: PCT/KR2018/004677
§ 371 (c)(1),
(2) Date: Jan. 4, 2019

(87) PCT Pub. No.: WO2019/009507
PCT Pub. Date: Jan. 10, 2019

(65) Prior Publication Data
US 2019/0187167 A1      Jun. 20, 2019

(30) Foreign Application Priority Data

Jul. 5, 2017   (KR) .................. 10-2017-0085651

(51) Int. Cl.
*G01P 5/06* (2006.01)
*F03D 3/04* (2006.01)
(Continued)

(52) U.S. Cl.
CPC .............. *G01P 5/06* (2013.01); *F03D 3/0409* (2013.01); *F03D 17/00* (2016.05); *G01H 11/06* (2013.01);
(Continued)

(58) Field of Classification Search
CPC ...... G01P 5/12; G01P 5/06; G01P 5/02; G01P 5/26; G01P 5/10; G01P 5/07;
(Continued)

(56) References Cited

U.S. PATENT DOCUMENTS

2005/0034516 A1*  2/2005  Yoshida .................. F03D 17/00
                                                        73/170.01
2009/0039651 A1*  2/2009  Stiesdal .................... G01P 5/24
                                                            290/44
(Continued)

FOREIGN PATENT DOCUMENTS

JP       2001278196 A     10/2001
KR       20050074861 A    7/2005
(Continued)

OTHER PUBLICATIONS

International Search Report (PCT/ISA/210) dated Jul. 27, 2018, by the Korean Patent Office as the International Searching Authority for International Application No. PCT/KR2018/004677.
(Continued)

*Primary Examiner* — Andre J Allen
(74) *Attorney, Agent, or Firm* — Buchanan Ingersoll & Rooney PC

(57) ABSTRACT

Provided are a three-dimensional (3D) ultrasonic anemometer, a 3D wind velocity measuring method, and a wind turbine. The 3D ultrasonic anemometer includes: an ultrasonic sensor including three pairs of ultrasonic transceivers arranged in different directions, wherein the ultrasonic sensor is installed at a rotation body rotating around a rotation
(Continued)

US 10,871,502 B2

Page 2 axis and rotates around the rotation axis together with the rotation body; a signal processor outputting a 3D sensed wind velocity sensed by the ultrasonic sensor; and a coordinate converter converting the 3D sensed wind velocity into a 3D fixed wind velocity on a fixed coordinate system by using a rotation angle φ of the rotation body.

23 Claims, 8 Drawing Sheets

(51) Int. Cl.
*G01P 5/24* (2006.01)
*G01H 11/06* (2006.01)
*F03D 17/00* (2016.01)

(52) U.S. Cl.
CPC .............. *G01P 5/24* (2013.01); *G01P 5/248* (2013.01); *F05B 2270/32* (2013.01); *F05B 2270/321* (2013.01)

(58) Field of Classification Search
CPC .......... G01P 21/025; G01P 13/02; G01P 1/00; G01P 13/045; G01P 1/026; G01P 5/242; G01P 3/443; G01P 3/46; G01P 5/08; G01P 5/165; G01P 5/18; G01P 5/241; G01P 5/245; G01P 13/025; G01P 1/06; G01P 1/122; G01P 5/001; G01P 5/14; G01P 5/24; G01P 5/248; G01F 1/698; G01F 1/684; G01F 1/696; G01F 1/6845; G01F 1/6965; G01F 1/688; G01F 1/692; G01F 1/74; G01F 15/18; G01F 15/185; G01F 1/6842; G01F 1/6888; G01F 1/69; G01F 1/6983; G01F 1/86; G01F 25/0053; G01F 5/00; G01F 1/662; G01F 1/699; G01F 15/006; G01F 15/12; G01F 15/14; G01F 1/28; G01F 1/64
See application file for complete search history.

(56) References Cited

U.S. PATENT DOCUMENTS

| | | | | |
|---|---|---|---|---|
| 2009/0108582 A1* | 4/2009 | Seibers | .................. | F03D 7/026 290/44 |
| 2009/0142192 A1* | 6/2009 | LeClair | .................. | G01P 13/02 416/9 |
| 2010/0140953 A1* | 6/2010 | Santos | ...................... | G01P 5/12 290/55 |
| 2016/0146195 A1* | 5/2016 | Holtom | ..................... | G01P 5/26 356/28 |
| 2017/0175714 A1* | 6/2017 | Asheim | ..................... | F03D 7/00 |
| 2019/0242366 A1* | 8/2019 | Chang | ....................... | G01P 5/24 |

FOREIGN PATENT DOCUMENTS

KR       20160133084 A       11/2016
KR         101715138 B1       3/2017

OTHER PUBLICATIONS

Korean Notice of Allowance for KR 10-2017-0085651 dated Jan. 17, 2018.
Korean Office Action for KR 10-2017-0085651 dated Sep. 20, 2017.

* cited by examiner

ROTATING THREE-DIMENSIONAL ULTRASONIC ANEMOMETER AND METHOD OF MEASURING THREE-DIMENSIONAL WIND VELOCITY USING THE SAME

TECHNICAL FIELD

The present disclosure relates to a rotating three-dimensional (3D) ultrasonic anemometer and a 3D wind velocity measuring method using the same, and more particularly, to a 3D ultrasonic anemometer mounted on a rotation body to rotate and a 3D wind velocity measuring method using the same.

BACKGROUND ART

In general, an anemometer is used to measure a wind velocity in a fixed state. For example, the wind velocity of the wind blowing toward a rotating wind turbine is measured mainly by an anemometer installed at a nacelle in the rear of the wind turbine, the wind velocity is measured by using a cup anemometer or a propeller anemometer, and the wind direction is measured by using a wind vane. An ultrasonic anemometer may be used instead of the anemometer and the wind vane. However, since the ultrasonic anemometer is installed on a cover of a nacelle in the rear of a wind turbine, it may be directly affected by a slipstream generated by the rotation of rotation blades of the wind turbine and thus accurate wind velocity and direction measurement may be difficult. Accordingly, since there may be a limitation in matching the rotation axis of the rotation blades to the wind direction, the power generation efficiency of the wind turbine may be degraded.

DESCRIPTION OF EMBODIMENTS

Technical Problem

Provided is a three-dimensional (3D) ultrasonic anemometer that is mounted on a rotation body such as a wind turbine, rotates together with the rotation body, and measures the 3D wind velocity of the wind blowing toward the rotation body.

Also, provided is a method of measuring the 3D wind velocity of the wind blowing toward a rotation body such as a wind turbine by using a 3D ultrasonic anemometer that is mounted on the rotation body and rotates together with the rotation body.

Also, provided is a wind turbine that is controlled by using a 3D wind velocity measured by a 3D ultrasonic anemometer installed in the front thereof.

Solution to Problem

According to an aspect of the present disclosure, a three-dimensional (3D) ultrasonic anemometer includes: an ultrasonic sensor including three pairs of ultrasonic transceivers arranged in different directions, wherein the ultrasonic sensor is installed at a rotation body rotating around a rotation axis and rotates around the rotation axis together with the rotation body; a signal processor outputting a 3D sensed wind velocity (Us, Vs, Ws) sensed by the ultrasonic sensor; and a coordinate converter converting the 3D sensed wind velocity (Us, Vs, Ws) into a 3D fixed wind velocity (U, V, W) on a fixed coordinate system (X, Y, Z) by using a rotation angle $\varphi$ of the rotation body.

According to an embodiment, the 3D ultrasonic anemometer may further include a rotation angle sensor including a gravity sensor rotating together with the rotation body, wherein the rotation angle sensor may sense the rotation angle $\varphi$ of the rotation body by using the gravity sensor and output the rotation angle $\varphi$ to the coordinate converter.

According to an embodiment, the coordinate converter may receive, in real time, information about the rotation angle $\varphi$ of the rotation body from an external device including the rotation body.

According to an embodiment, the 3D sensed wind velocity (Us, Vs, Ws) may be defined on a sensing coordinate system (Xs, Ys, Zs) of the ultrasonic sensor. An X axis of the fixed coordinate system (X, Y, Z) may be in the same direction as the rotation axis, and the X axis, a Y axis, and a Z axis of the fixed coordinate system (X, Y, Z) may be perpendicular to each other.

According to an embodiment, when the ultrasonic sensor is aligned on the rotation axis such that an Xs axis of the sensing coordinate system (Xs, Ys, Zs) is arranged on the rotation axis, the coordinate converter may calculate the 3D fixed wind velocity (U, V, W) as U=Us, V=Vs cos($\varphi$)−Ws sin($\varphi$), and W=Vs sin($\varphi$)+Ws cos($\varphi$) based on the 3D sensed wind velocity (Us, Vs, Ws) and the rotation angle $\varphi$.

According to an embodiment, the coordinate converter may include: a first coordinate converter converting the 3D sensed wind velocity (Us, Vs, Ws) on the sensing coordinate system (Xs, Ys, Zs) into a 3D rotation wind velocity (U', V', W') on a rotating coordinate system (X', Y', Z'); and a second coordinate converter converting the 3D rotation wind velocity (U', V', W') on the rotating coordinate system (X', Y', Z') into the 3D fixed wind velocity (U, V, W) on the fixed coordinate system (X, Y, Z). An X' axis of the rotating coordinate system (X', Y', Z') may be parallel to the X axis of the fixed coordinate system (X, Y, Z), and a Y' axis and a Z' axis of the rotating coordinate system (X', Y', Z') may be rotated by the rotation angle $\varphi$ from the Y axis and the Z axis of the fixed coordinate system (X, Y, Z), respectively.

According to an embodiment, when the ultrasonic sensor is installed on the rotation body such that an Xs axis of the sensing coordinate system (Xs, Ys, Zs) is spaced apart from the rotation axis by a spacing distance R at a spacing angle $\delta$ and the rotation body rotates around the rotation axis at an angular velocity $\omega$, the first coordinate converter may calculate the 3D rotation wind velocity (U', V', W') as U'=Us, V'=Vs−R$\omega$ sin($\delta$), and W'=Ws+R$\omega$ cos($\delta$) based on the 3D sensed wind velocity (Us, Vs, Ws) and the spacing angle $\delta$. The spacing angle $\delta$ may be defined as an angle toward a Zs axis with respect to a Ys axis of the sensing coordinate system (Xs, Ys, Zs).

According to an embodiment, the first coordinate converter may calculate the angular velocity $\omega$ based on the rotation angle $\varphi$ of the rotation body.

According to an embodiment, the spacing distance R may be calculated by dividing a magnitude of the 3D sensed wind velocity (Us, Vs, Ws) in a windless state by the angular velocity $\omega$.

According to an embodiment, the spacing angle $\delta$ may be calculated as $\tan^{-1}(-Vs/Ws)$ based on the 3D sensed wind velocity (Us, Vs, Ws) in a windless state.

According to an embodiment, the second coordinate converter may calculate the 3D fixed wind velocity (U, V, W) as U=U', V=V' cos($\varphi$)−W' sin($\varphi$), and W=V' sin($\varphi$)+W' cos($\varphi$) based on the 3D rotation wind velocity (U', V', W') and the rotation angle $\varphi$.

According to an embodiment, the coordinate converter may include: a first coordinate converter converting the 3D sensed wind velocity (Us, Vs, Ws) on the sensing coordinate system (Xs, Ys, Zs) into a 3D offset wind velocity (U", V", W") on an offset coordinate system (X", Y", Z"); a second coordinate converter converting the 3D offset wind velocity (U", V", W") on the offset coordinate system (X", Y", Z") into a 3D rotation wind velocity (U', V', W') on a rotating coordinate system (X', Y', Z'); and a third coordinate converter converting the 3D rotation wind velocity (U', V', W') on the rotating coordinate system (X', Y', Z') into the 3D fixed wind velocity (U, V, W) on the fixed coordinate system (X, Y, Z). An X" axis of the offset coordinate system (X", Y", Z") may be spaced apart from an X' axis of the rotating coordinate system (X', Y', Z') by a spacing distance R at a spacing angle δ, and a Y" axis and a Z" axis of the offset coordinate system (X", Y", Z") may be parallel to a Y' axis and a Z' axis of the rotating coordinate system (X', Y', Z'), respectively. The X' axis of the rotating coordinate system (X', Y', Z') may be parallel to the X axis of the fixed coordinate system (X, Y, Z), and the Y' axis and the Z' axis of the rotating coordinate system (X', Y', Z') may be rotated by the rotation angle φ from the Y axis and the Z axis of the fixed coordinate system (X, Y, Z), respectively.

According to an embodiment, when the ultrasonic sensor is installed on the rotation body such that the sensing coordinate system (Xs, Ys, Zs) is the same as a coordinate system rotated by a third offset angle θz with respect to a third axis of a coordinate system rotated by a second offset angle θy with respect to a second axis of a coordinate system rotated by a first offset angle θx with respect to a first axis (X" axis) of the offset coordinate system (X", Y", Z"), and the rotation body rotates around the rotation axis at an angular velocity ω, the first coordinate converter calculates the 3D offset wind velocity (U", V", W") as $$\begin{bmatrix} U'' \\ V'' \\ W'' \end{bmatrix} = \begin{bmatrix} 1 & 0 & 0 \\ 0 & \cos\theta x & -\sin\theta x \\ 0 & \sin\theta x & \cos\theta x \end{bmatrix} \begin{bmatrix} \cos\theta y & 0 & \sin\theta y \\ 0 & 1 & 0 \\ -\sin\theta y & 0 & \cos\theta y \end{bmatrix}$$
$$\begin{bmatrix} \cos\theta z & -\sin\theta z & 0 \\ \sin\theta z & \cos\theta z & 0 \\ 0 & 0 & 1 \end{bmatrix} \begin{bmatrix} Us \\ Vs \\ Ws \end{bmatrix}$$

based on the 3D sensed wind velocity (Us, Vs, Ws) and the first to third offset angles θx, θy, and θz.

According to an embodiment, the first to third offset angles θx, θy, and θz may be calculated as $$\begin{bmatrix} 0 \\ R\omega\sin\delta \\ -R\omega\cos\delta \end{bmatrix} = \begin{bmatrix} 1 & 0 & 0 \\ 0 & \cos\theta x & -\sin\theta x \\ 0 & \sin\theta x & \cos\theta x \end{bmatrix} \begin{bmatrix} \cos\theta y & 0 & \sin\theta y \\ 0 & 1 & 0 \\ -\sin\theta y & 0 & \cos\theta y \end{bmatrix}$$
$$\begin{bmatrix} \cos\theta z & -\sin\theta z & 0 \\ \sin\theta z & \cos\theta z & 0 \\ 0 & 0 & 1 \end{bmatrix} \begin{bmatrix} Us \\ Vs \\ Ws \end{bmatrix}$$

based on the spacing distance R, the angular velocity ω, the spacing angle δ, and the 3D sensed wind velocity (Us, Vs, Ws) measured in a windless state. The spacing angle δ may be defined as an angle toward the Z" axis with respect to the Y" axis of the offset coordinate system (X", Y", Z").

According to an embodiment, the second coordinate converter may calculate the 3D rotation wind velocity (U', V', W') as U'=U", V'=V"−Rω sin(δ), and W'=W"+Rω cos(δ) based on the 3D offset wind velocity (U", V", W") and the spacing angle δ. The third coordinate converter may calculate the 3D fixed wind velocity (U, V, W) as U=U', V=V' cos(φ)−W' sin(φ), and W=V' sin(φ)+W' cos(φ) based on the 3D rotation wind velocity (U', V', W') and the rotation angle φ. The spacing angle δ may be defined as an angle toward a Zs axis with respect to a Ys axis of the sensing coordinate system (Xs, Ys, Zs).

According to another aspect of the present disclosure, a three-dimensional (3D) wind velocity measuring method includes: receiving a 3D sensed wind velocity (Us, Vs, Ws) on a sensing coordinate system (Xs, Ys, Zs), which is sensed by a 3D ultrasonic anemometer that is installed at a rotation body rotating around a rotation axis and rotates around the rotation axis together with the rotation body; receiving a rotation angle φ of the rotation body; and converting the 3D sensed wind velocity (Us, Vs, Ws) on the sensing coordinate system (Xs, Ys, Zs) into a 3D fixed wind velocity (U, V, W) on a fixed coordinate system (X, Y, Z) by using the rotation angle φ.

According to an embodiment, an X axis of the fixed coordinate system (X, Y, Z) may be in the same direction as the rotation axis, and the X axis, a Y axis, and a Z axis of the fixed coordinate system (X, Y, Z) may be perpendicular to each other.

According to an embodiment, when an Xs axis of the sensing coordinate system (Xs, Ys, Zs) is located on the rotation axis, in the converting of the 3D sensed wind velocity (Us, Vs, Ws) into the 3D fixed wind velocity (U, V, W), the 3D fixed wind velocity (U, V, W) may be calculated as U=Us, V=Vs cos(φ)− Ws sin(φ), and W=Vs sin(φ)+Ws cos(φ) based on the 3D sensed wind velocity (Us, Vs, Ws) and the rotation angle φ.

According to an embodiment, the converting of the 3D sensed wind velocity (Us, Vs, Ws) into the 3D fixed wind velocity (U, V, W) may include: converting the 3D sensed wind velocity (Us, Vs, Ws) on the sensing coordinate system (Xs, Ys, Zs) into a 3D rotation wind velocity (U', V', W') on a rotating coordinate system (X', Y', Z'); and converting the 3D rotation wind velocity (U', V', W') on the rotating coordinate system (X', Y', Z') into the 3D fixed wind velocity (U, V, W) on the fixed coordinate system (X, Y, Z). An X' axis of the rotating coordinate system (X', Y', Z') may be parallel to the X axis of the fixed coordinate system (X, Y, Z), and a Y' axis and a Z' axis of the rotating coordinate system (X', Y', Z') may be rotated by the rotation angle φ from the Y axis and the Z axis of the fixed coordinate system (X, Y, Z), respectively.

According to an embodiment, when an Xs axis of the sensing coordinate system (Xs, Ys, Zs) is spaced apart from the rotation axis by a spacing distance R at a spacing angle δ and the rotation body rotates around the rotation axis at an angular velocity ω, the 3D rotation wind velocity (U', V', W') may be calculated as U'=Us, V'=Vs−Rω sin(δ), and W'=Ws+Rω cos(δ) based on the 3D sensed wind velocity (Us, Vs, Ws) and the spacing angle δ. The 3D fixed wind velocity (U, V, W) is calculated as U=U', V=V' cos(φ)− W' sin(φ), and W=V' sin(φ)+W' cos(φ) based on the 3D rotation wind velocity (U', V', W') and the rotation angle φ. The spacing angle δ may be defined as an angle toward a Zs axis with respect to a Ys axis of the sensing coordinate system (Xs, Ys, Zs).

According to an embodiment, the converting of the 3D sensed wind velocity (Us, Vs, Ws) into the 3D fixed wind velocity (U, V, W) may include: converting the 3D sensed wind velocity (Us, Vs, Ws) on the sensing coordinate system (Xs, Ys, Zs) into a 3D offset wind velocity (U", V", W") on an offset coordinate system (X", Y", Z"); converting the 3D offset wind velocity (U", V", W") on the offset coordinate system (X", Y", Z") into a 3D rotation wind velocity (U', V', W') on a rotating coordinate system (X', Y', Z'); and converting the 3D rotation wind velocity (U', V', W') on the rotating coordinate system (X', Y', Z') into the 3D fixed wind velocity (U, V, W) on the fixed coordinate system (X, Y, Z). An X" axis of the offset coordinate system (X", Y", Z") may be spaced apart from an X' axis of the rotating coordinate system (X', Y', Z') by a spacing distance R at a spacing angle δ, and a Y" axis and a Z" axis of the offset coordinate system (X", Y", Z") may be parallel to a Y' axis and a Z' axis of the rotating coordinate system (X', Y', Z'), respectively. The X' axis of the rotating coordinate system (X', Y', Z') may be parallel to the X axis of the fixed coordinate system (X, Y, Z), and the Y' axis and the Z' axis of the rotating coordinate system (X', Y', Z') may be rotated by the rotation angle φ from the Y axis and the Z axis of the fixed coordinate system (X, Y, Z), respectively.

According to an embodiment, when the sensing coordinate system (Xs, Ys, Zs) is the same as a coordinate system rotated by a third offset angle θz with respect to a third axis of a coordinate system rotated by a second offset angle θy with respect to a second axis of a coordinate system rotated by a first offset angle θx with respect to a first axis (X" axis) of the offset coordinate system (X", Y", Z") and the rotation body rotates around the rotation axis at an angular velocity ω, the 3D offset wind velocity (U", V", W") may be calculated as $$\begin{bmatrix} U'' \\ V'' \\ W'' \end{bmatrix} = \begin{bmatrix} 1 & 0 & 0 \\ 0 & \cos\theta x & -\sin\theta x \\ 0 & \sin\theta x & \cos\theta x \end{bmatrix} \begin{bmatrix} \cos\theta y & 0 & \sin\theta y \\ 0 & 1 & 0 \\ -\sin\theta y & 0 & \cos\theta y \end{bmatrix}$$
$$\begin{bmatrix} \cos\theta z & -\sin\theta z & 0 \\ \sin\theta z & \cos\theta z & 0 \\ 0 & 0 & 1 \end{bmatrix} \begin{bmatrix} Us \\ Vs \\ Ws \end{bmatrix}$$

based on the 3D sensed wind velocity (Us, Vs, Ws) and the first to third offset angles θx, θy, and θz. The 3D rotation wind velocity (U', V', W') may be calculated as U'=U", V'=V"− Rω sin(δ), and W'=W"+Rω cos(δ) based on the 3D offset wind velocity (U", V", W") and the spacing angle δ. The 3D fixed wind velocity (U, V, W) may be calculated as U=U', V=V cos(φ)− W' sin(φ), and W=V' sin(φ)+W' cos(φ) based on the 3D rotation wind velocity (U', V', W') and the rotation angle φ. The spacing angle δ may be defined as an angle toward a Zs axis with respect to a Ys axis of the sensing coordinate system (Xs, Ys, Zs).

According to another aspect of the present disclosure, a wind turbine includes: a hub rotating along a rotation axis; rotation blades installed at the hub to rotate the hub by wind power; a nacelle generating electricity by the rotation of the hub; a three-dimensional (3D) ultrasonic anemometer outputting a 3D fixed wind velocity (U, V, W) on a fixed coordinate system (X, Y, Z); and a controller controlling at least one of a pitch angle of the rotation blades and a yaw angle of the rotation axis by using the 3D fixed wind velocity (U, V, W). The 3D ultrasonic anemometer may include: an ultrasonic sensor including three pairs of ultrasonic transceivers arranged in different directions, wherein the ultrasonic sensor is installed at a spinner of the hub rotating around the rotation axis and rotates around the rotation axis together with the hub; a signal processor outputting a 3D sensed wind velocity (Us, Vs, Ws) on a sensing coordinate system (Xs, Vs, Ws) sensed by the ultrasonic sensor; and a coordinate converter converting the 3D sensed wind velocity (Us, Vs, Ws) into the 3D fixed wind velocity (U, V, W) by using a rotation angle φ of the hub.

Advantageous Effects of Disclosure

According to various embodiments, since the 3D ultrasonic anemometer may be installed at the spinner of the hub of the wind turbine, the 3D ultrasonic anemometer may not be affected by a slipstream generated by the rotation of the rotation blades and thus accurate wind velocity and direction measurement may be performed. Accordingly, since the rotation axis of the rotation blade may be matched to the wind direction, the power generation efficiency of the wind turbine may be improved.

BEST MODE

Figure 1:
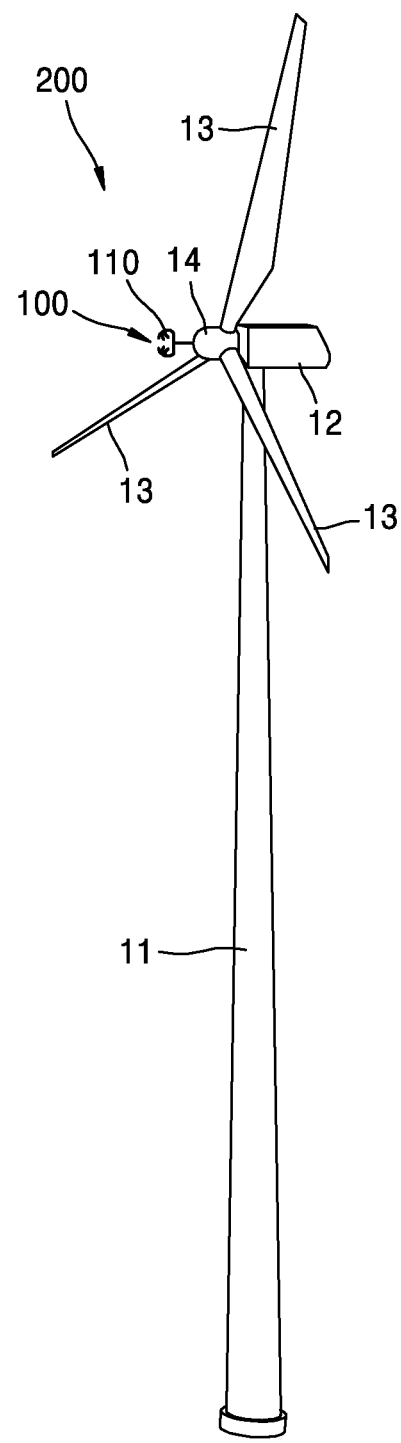
FIG. 1 is a perspective view of a wind turbine according to an embodiment.

Hereinafter, various embodiments of the present disclosure will be described in detail with reference to the accompanying drawings.

The embodiments of the present disclosure are provided to more fully describe the present disclosure to those of ordinary skill in the art, the following embodiments may be modified into various other forms, and the scope of the present disclosure is not limited to the following embodiments. Rather, these embodiments are provided so that this disclosure will be more thorough and complete, and will fully convey the concept of the disclosure to those of ordinary skill in the art.

The terminology used herein is for the purpose of describing particular embodiments only and is not intended to limit the present disclosure. As used herein, the singular forms "a", "an", and "the" may include plural forms unless the context clearly indicates otherwise. Also, when used in this specification, the terms "include (comprise)" and/or "including (comprising)" specify the presence of the stated shapes, numbers, steps, operations, members, elements, and/or groups thereof and do not preclude the presence or addition of one or more other shapes, numbers, operations, members, elements, and/or groups thereof. As used herein, the term "and/or" may include any and all combinations of one or more of the associated listed items.

Although terms such as "first" and "second" are used herein to describe various members, regions, and/or portions, these members, components, regions, layers, and/or portions are not limited by these terms. These terms are not intended to mean particular orders, priorities, or superiorities, and are used only to distinguish one member, region, or portion from another member, region, or portion. Thus, a first member, region, or portion to be described below may refer to a second member, region, or portion without departing from the teachings of the present disclosure.

Hereinafter, embodiments of the present disclosure will be described with reference to the drawings schematically illustrating example embodiments of the present disclosure. In the drawings, variations from the illustrated shapes may be expected as a result of, for example, manufacturing techniques and/or tolerances. Thus, the embodiments of the present disclosure should not be construed as being limited to the particular shapes of regions illustrated herein but may include deviations in shapes that result, for example, from manufacturing processes.

Figure 2:
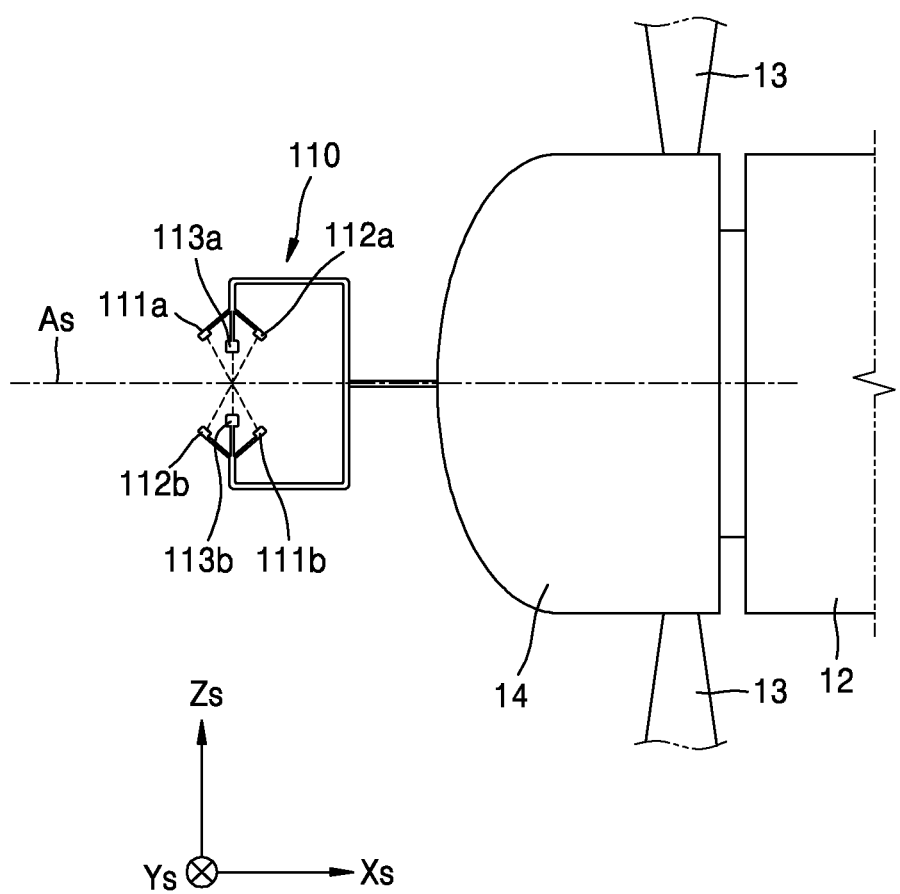
FIG. 2 is an enlarged side view of a portion of the wind turbine of FIG. 1.

FIG. 1 is a perspective view of a wind turbine according to an embodiment. FIG. 2 is an enlarged side view of a portion of the wind turbine of FIG. 1.

Referring to FIGS. 1 and 2, a wind turbine 200 may include a vertical axis 11, a nacelle 12 arranged at a top portion of the vertical axis 11, a hub 14 arranged in front of the nacelle 12 to rotate along a rotation axis As, and rotation blades 13 installed at the hub 14 to rotate the hub 14 by wind power. The nacelle 12 may generate electricity by the rotation of the hub 14. As the rotation blades 13 rotate by wind, the hub 14 may rotate along the rotation axis As and electricity may be generated in the nacelle 12 by the rotation of the hub 14.

The wind turbine 200 may further include a three-dimensional (3D) ultrasonic anemometer 100 outputting a 3D fixed wind velocity (U, V, W) on a fixed coordinate system (X, Y, Z) and a controller controlling at least one of a pitch angle of the rotation blades 13 and a yaw angle of the rotation axis As by using the 3D fixed wind velocity (U, V, W) output from the 3D ultrasonic anemometer 100. Although not illustrated in FIG. 1, the controller may be installed in the nacelle 12 or may control the wind turbine 200 as an external device. The fixed coordinate system (X, Y, Z) may be defined dependently on the rotation axis As. That is, when the yaw angle of the rotation axis As changes, the fixed coordinate system (X, Y, Z) may also change together. For example, an X axis of the fixed coordinate system (X, Y, Z) may be in the same direction as the rotation axis As, a Y axis of the fixed coordinate system (X, Y, Z) may be in a direction perpendicular to the rotation axis As and the vertical axis 11, and a Z axis of the fixed coordinate system (X, Y, Z) may be in a direction perpendicular to the X axis and the Y axis. The rotation axis As may be perpendicular to the vertical axis 11 and the vertical axis 11 may extend in a gravity direction. As another example, the rotation axis As may extend in a horizontal direction, that is, in a direction perpendicular to the gravity direction, or may extend to a height higher than the horizontal direction, for example, within 5 degrees.

The wind turbine 200 may generate electricity by using wind power. When the rotation blades 13 face the wind direction in which the wind blows, the power generation efficiency thereof may increase. The nacelle 12 may rotate in the horizontal direction on the vertical axis 11 and for this purpose, a first rotation drive device may be installed at the nacelle 12 or the vertical axis 11. By using the 3D fixed wind velocity (U, V, W), the controller may control the first rotation drive device to adjust the yaw angle of the rotation axis As such that the rotation blades 13 may face the wind direction, that is, a wind velocity V among the 3D fixed wind velocity (U, V, W) may be minimized.

The angle of the rotation blades 13 installed at the hub 14, for example, the pitch angle, may be adjusted. The power generation efficiency may be improved by adjusting the pitch angle of the rotation blades 13 according to the wind velocity of the wind blowing toward the rotation blades 13. A second rotation drive device for adjusting the pitch angle of the rotation blades 13 may be installed at the hub 14 or the rotation blades 13. By using the 3D fixed wind velocity (U, V, W), the controller may control the second rotation drive device to adjust the pitch angle of the rotation blades 13 according to the wind velocity of the blowing wind.

The 3D ultrasonic anemometer 100 may include an ultrasonic sensor 110. The ultrasonic sensor 110 may include three pairs of ultrasonic transceivers 111a and 111b, 112a and 112b, and 113a and 113b arranged in different directions. The ultrasonic sensor 110 may be installed at a spinner of the hub 14 rotating around the rotation axis As and rotate around the rotation axis As together with the hub 14. The spinner may be referred to as a nosecone.

As illustrated in FIG. 2, the ultrasonic sensor 110 may be arranged on the spinner of the hub 14. As illustrated in FIG. 2, the ultrasonic sensor 110 may be aligned with the rotation axis As. However, the ultrasonic sensor 110 may be arranged apart from the rotation axis As for manufacturing process reasons. Since the ultrasonic sensor 110 is arranged on the spinner of the hub 14, it may not be affected by a slipstream generated by the rotation of the rotation blades 13 and accurate 3D wind velocity measurement may be performed.

As illustrated in FIG. 2, the ultrasonic sensor 110 may include three pairs of ultrasonic transceivers 111a and 111b, 112a and 112b, and 113a and 113b, and the respective pairs of ultrasonic transceivers 111a and 111b, 112a and 112b, and 113a and 113b may be arranged to face each other in different directions. The three pairs of ultrasonic transceivers 111a and 111b, 112a and 112b, and 113a and 113b may include a first pair of ultrasonic transceivers 111a and 111b, a second pair of ultrasonic transceivers 112a and 112b, and a third pair of ultrasonic transceivers 113a and 113b.

The first pair of ultrasonic transceivers 111a and 111b may communicate first ultrasonic waves with each other in a first direction, the second pair of ultrasonic transceivers 112a and 112b may exchange second ultrasonic waves with each other in a second direction, and the third pair of ultrasonic transceivers 113a and 113b may exchange third ultrasonic waves with each other in a third direction. For example, a first ultrasonic wave generated by a first ultrasonic transceiver 111a may be received by a second ultrasonic transceiver 111b, and a first ultrasonic wave generated by the second ultrasonic transceiver 111b may be received by the first ultrasonic transceiver 111a. The first to third directions may be different directions. The first to third directions may be perpendicular to each other.

The speed of the ultrasonic wave may depend on the wind velocity. Thus, the wind velocity in the first direction may be measured based on the speed of the first ultrasonic wave measured by using the first pair of ultrasonic transceivers 111a and 111b. The wind velocity in the second direction may be measured based on the speed of the second ultrasonic wave measured by using the second pair of ultrasonic transceivers 112a and 112b. The wind velocity in the third direction may be measured based on the speed of the third ultrasonic wave measured by using the third pair of ultrasonic transceivers 113a and 113b. For example, the speed of the first ultrasonic wave may be calculated based on the distance between the first pair of ultrasonic transceivers 111a and 111b and the travel time of the first ultrasonic wave between the first pair of ultrasonic transceivers 111a and 111b, that is, the time taken for the first ultrasonic wave to travel between the first pair of ultrasonic transceivers 111a and 111b.

The wind velocity in the first direction, the wind velocity in the second direction, and the wind velocity in the third direction may be converted into a 3D sensed wind velocity (Us, Vs, Ws) on a sensing coordinate system (Xs, Ys, Zs) of the ultrasonic sensor 110. The sensing coordinate system (Xs, Ys, Zs) may be predetermined by the arrangement of the ultrasonic sensor 110, and an Xs axis thereof may be preset in a direction in which a support member supporting the three pairs of ultrasonic transceivers 111a and 111b, 112a and 112b, and 113a and 113b extends. As illustrated in FIG. 2, the Xs axis of the sensing coordinate system (Xs, Ys, Zs) may be located on the rotation axis As.

The 3D ultrasonic anemometer 100 will be described in more detail below.

Figure 3A:
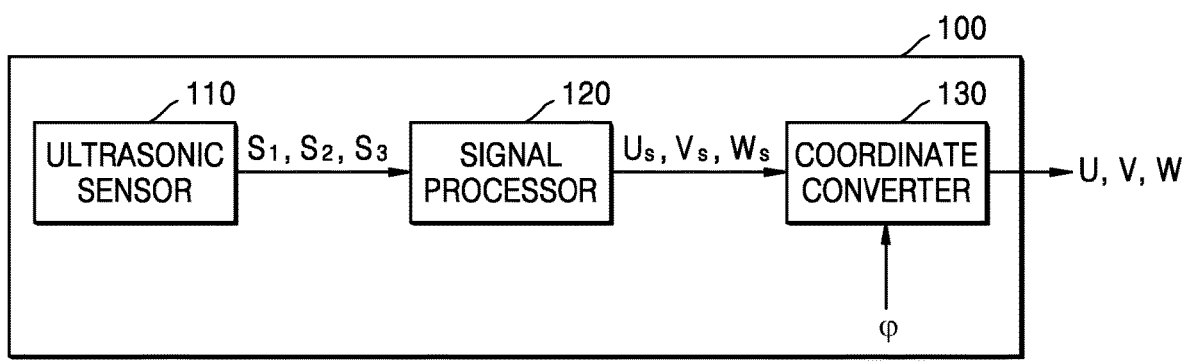
FIG. 3A is a block diagram of a three-dimensional (3D) ultrasonic anemometer according to an embodiment.
Figure 4A:
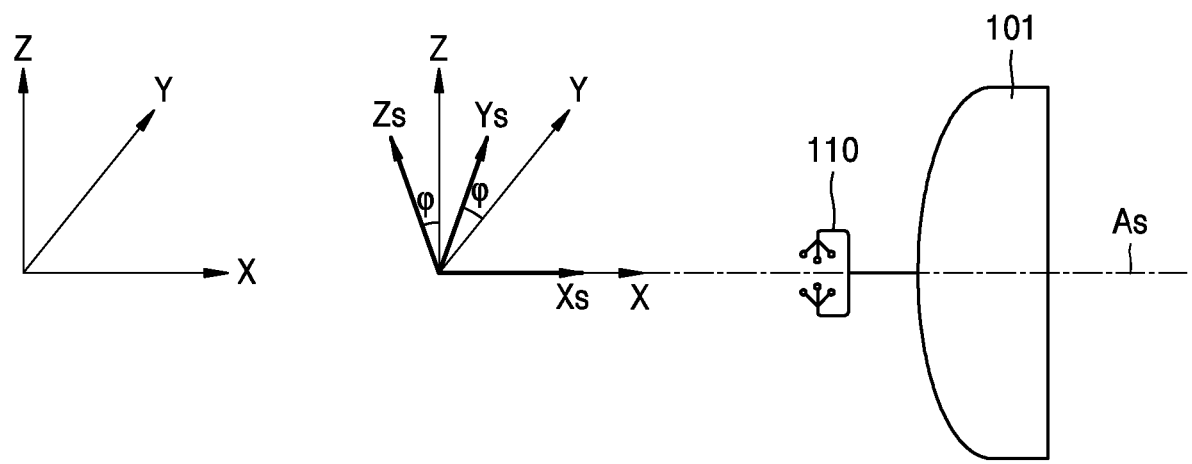
FIGS. 4A and 4B illustrate the relationship between a sensing coordinate system and a fixed coordinate system depending on the position of an ultrasonic sensor according to an embodiment.
Figure 4B:
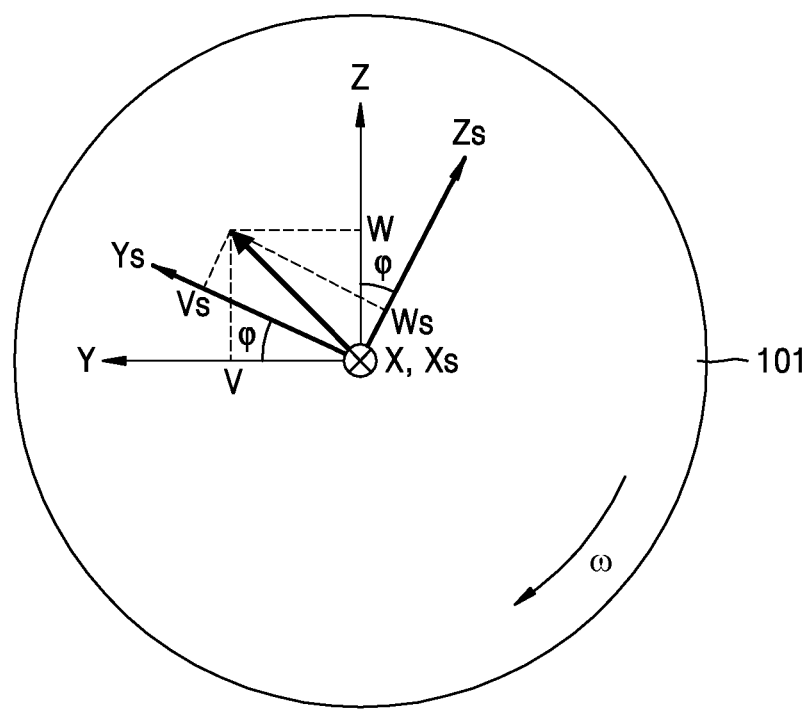

FIG. 3A is a block diagram of a 3D ultrasonic anemometer according to an embodiment. FIGS. 4A and 4B illustrate the relationship between a sensing coordinate system and a fixed coordinate system depending on the position of an ultrasonic sensor according to an embodiment.

Referring to FIG. 3A together with FIGS. 4A and 4B, a 3D ultrasonic anemometer 100 may include an ultrasonic sensor 110, a signal processor 120, and a coordinate converter 130.

The ultrasonic sensor 110 may include three pairs of ultrasonic transceivers 111a and 111b, 112a and 112b, and 113a and 113b arranged in different directions as illustrated in FIG. 2. The ultrasonic sensor 110 may be installed at a rotation body 101 such as the hub 14 of FIG. 2 rotating around a rotation axis (As of FIG. 2) and rotate around the rotation axis As together with the rotation body 101. The ultrasonic sensor 110 may output a first signal $S_1$ corresponding to the travel time of a first ultrasonic wave between a first pair of ultrasonic transceivers 111a and 111b in a first direction, a second signal $S_2$ corresponding to the travel time of a second ultrasonic wave between a second pair of ultrasonic transceivers 112a and 112b in a second direction, and a third signal $S_3$ corresponding to the travel time of a third ultrasonic wave between a third pair of ultrasonic transceivers 113a and 113b in a third direction.

The signal processor 120 may output a 3D sensed wind velocity (Us, Vs, Ws) sensed by the ultrasonic sensor 110. The signal processor 120 may receive the first to third signals $S_1$, $S_2$, and $S_3$ from the ultrasonic sensor 110. The signal processor 120 may have information about a first distance between the first pair of ultrasonic transceivers 111a and 111b, a second distance between the second pair of ultrasonic transceivers 112a and 112b, and a third distance between the third pair of ultrasonic transceivers 113a and 113b. The signal processor 120 may calculate the speeds of the first to third ultrasonic waves traveling in the first to third directions based on the first to third signals $S_1$, $S_2$, and $S_3$ and the information about the first to third distances, respectively.

The speed of the ultrasonic wave may depend on the wind velocity. The signal processor 120 may calculate the wind velocity in the first direction based on the speed of the first ultrasonic wave traveling in the first direction. The signal processor 120 may calculate the wind velocity in the second direction based on the speed of the second ultrasonic wave traveling in the second direction. The signal processor 120 may calculate the wind velocity in the third direction based on the speed of the third ultrasonic wave traveling in the third direction. The signal processor 120 may generate a 3D sensed wind velocity (Us, Vs, Ws) on a sensing coordinate system (Xs, Ys, Zs) by vector-converting the wind velocitys in the first to third directions. A first sensed wind velocity Us may be a wind velocity in an Xs-axis direction, a second sensed wind velocity Vs may be a wind velocity in a Ys-axis direction, and a third sensed wind velocity Ws may be a wind velocity in a Zs-axis direction. The sensing coordinate system (Xs, Ys, Zs) may be predetermined by the arrangement of the ultrasonic sensor 110.

The coordinate converter 130 may convert the 3D sensed wind velocity (Us, Vs, Ws) into 3D fixed wind velocity (U, U, Z) on a fixed coordinate system (X, Y, Z) by using a rotation angle φ of the rotation body 101. The rotation angle φ of the rotation body 101 may mean an angle at which the rotation body 101 rotates, and since the ultrasonic sensor 110 rotates together with the rotation body 101, the rotation angle φ may correspond to an angle at which the sensing coordinate system (Xs, Ys, Zs) of the ultrasonic sensor 110 rotates from the fixed coordinate system (X, Y, Z).

The signal processor 120 and the coordinate converter 130 may be implemented as a computing device including a processor and a memory. The processor of the computing device may generate a 3D sensed wind velocity (Us, Vs, Ws) based on the output of the ultrasonic sensor 110, receive a rotation angle φ of the rotation body 101, convert the 3D sensed wind velocity (Us, Vs, Ws) into a 3D fixed wind velocity (U, V, W) on the fixed coordinate system (X, Y, Z) by using the rotation angle φ, and output the 3D fixed wind velocity (U, V, W). The memory may store instructions and data for performing the above operation of the processor.

The rotation body 101 may rotate at an angular velocity ω. The coordinate converter 130 may calculate the angular velocity ω based on the rotation angle φ. For example, the coordinate converter 130 may determine the angular velocity ω based on a variation of the rotation angle φ.

The coordinate converter 130 may receive, in real time, information about the rotation angle φ of the rotation body 101 from an external device including the rotation body 101, for example, the wind turbine 200 including the hub 14. For example, the hub 14 or the nacelle 12 may include a rotation angle sensor capable of sensing the rotation angle φ, and the coordinate converter 130 may receive information about the rotation angle φ from the rotation angle sensor.

When the ultrasonic sensor 110 is arranged at the hub 14 of the wind turbine 200 as illustrated in FIGS. 1 and 2, the X axis of the fixed coordinate system (X, Y, Z may be in the same direction as the rotation axis As and the X axis, Y axis, and Z axis of the fixed coordinate system (X, Y, Z) may be perpendicular to each other, as illustrated in FIGS. 4A and 4B. In this case, the Y axis of the fixed coordinate system (X, Y, Z) may be in a direction perpendicular to the rotation axis As and the vertical axis 11. The Z axis of the fixed coordinate system (X, Y, Z) may extend in a direction approximately opposite to the direction of gravity.

As illustrated in FIG. 4A, when the ultrasonic sensor 110 is arranged in alignment with the rotation axis As of the rotation body 101, the ultrasonic sensor 110 may be arranged on the rotation axis As such that the Xs axis of the sensing coordinate system (Xs, Ys, Zs) may be arranged on the rotation axis As. In this case, as illustrated in FIG. 4B, the 3D sensed wind velocity (Us, Vs, Ws) on the sensing coordinate system (Xs, Ys, Zs) may be the same as the 3D fixed wind velocity (U, V, W) on the fixed coordinate system (X, Y, Z). Thus, the coordinate converter 130 may calculate the 3D fixed wind velocity (U, V, W) according to [Equation 1] below based on the 3D sensed wind velocity (Us, Vs, Ws) and the rotation angle φ.

$$U = Us$$

$$V = Vs\cos(\varphi) - Ws\sin(\varphi)$$

$$W = Vs\sin(\varphi) + Ws\cos(\varphi) \qquad \text{[Equation 1]}$$

Since the ultrasonic sensor 110 may be installed at the hub 14 located in the front of the wind turbine 200 as illustrated in FIG. 2, the ultrasonic sensor 110 may not be affected by a slipstream caused by the rotation of the rotation blades 13 and thus accurate wind velocity and direction measurement may be performed. Accordingly, the rotation axis As of the hub 14 may be accurately matched to the wind direction and the power generation efficiency of the wind turbine 200 may be improved.

The signal processor 120 and the coordinate converter 130 may be implemented, for example, by a microcontroller that may be located in the nacelle 12 or the hub 14 of FIG. 2.

Figure 3B:
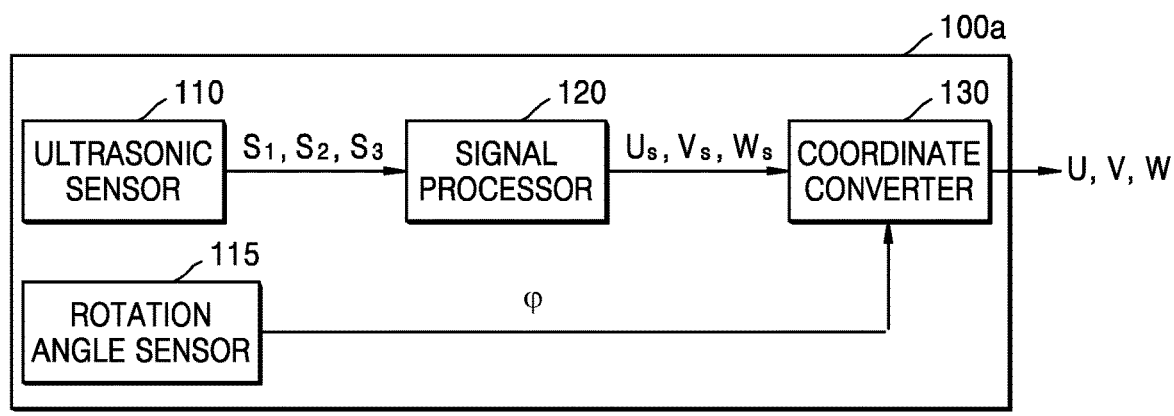
FIG. 3B is a block diagram of a 3D ultrasonic anemometer according to another embodiment.

FIG. 3B is a block diagram of a 3D ultrasonic anemometer according to another embodiment.

Referring to FIG. 3B, a 3D ultrasonic anemometer 100a may include an ultrasonic sensor 110, a signal processor 120, a coordinate converter 130, and a rotation angle sensor 115. Since the ultrasonic sensor 110, the signal processor 120, and the coordinate converter 130 may respectively correspond to the ultrasonic sensor 110, the signal processor 120, and the coordinate converter 130 of the 3D ultrasonic anemometer 100 and have been described above with reference to FIG. 3A, redundant descriptions thereof will be omitted for conciseness.

The rotation angle sensor 115 may include a gravity sensor that is fixed to the ultrasonic sensor 110 and rotates together with the rotation body 101. The rotation angle sensor 115 may sense the direction of gravity by using the gravity sensor and sense a rotation angle φ of the rotation body 101 based on the difference between a predetermined direction and the direction of gravity. Since the rotation angle sensor 115 may output the sensed rotation angle φ to the coordinate converter 130, the coordinate converter 130 may receive the rotation angle φ in real time. When the rotation axis As does not extend in the perpendicular direction of the direction of gravity, the rotation angle sensor 115 may have offset angle information about the difference between the extension direction of the rotation axis As and the perpendicular direction of the direction of gravity and the rotation angle φ of the rotation body 101 may be sensed by using the offset angle information.

Since the 3D ultrasonic anemometer 100a may sense the rotation angle φ by itself without receiving information about the rotation angle φ from the outside thereof, it may be easily attached to a device such as a wind turbine.

Figure 5:
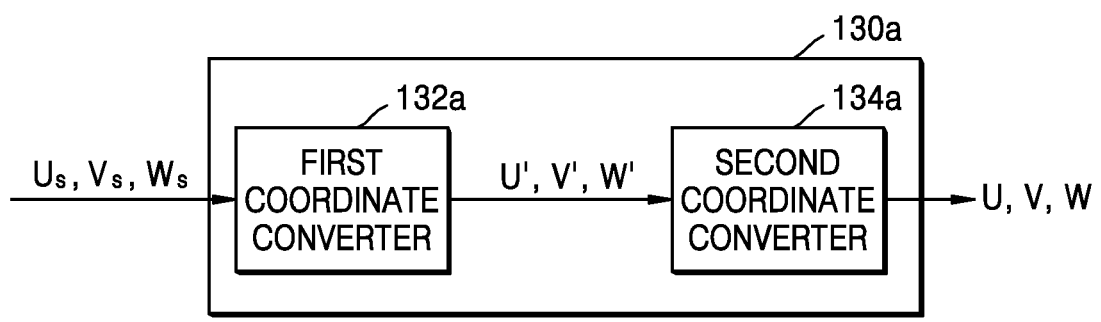
FIG. 5 is a block diagram of a coordinate converter of a 3D ultrasonic anemometer according to another embodiment.
Figure 6A:
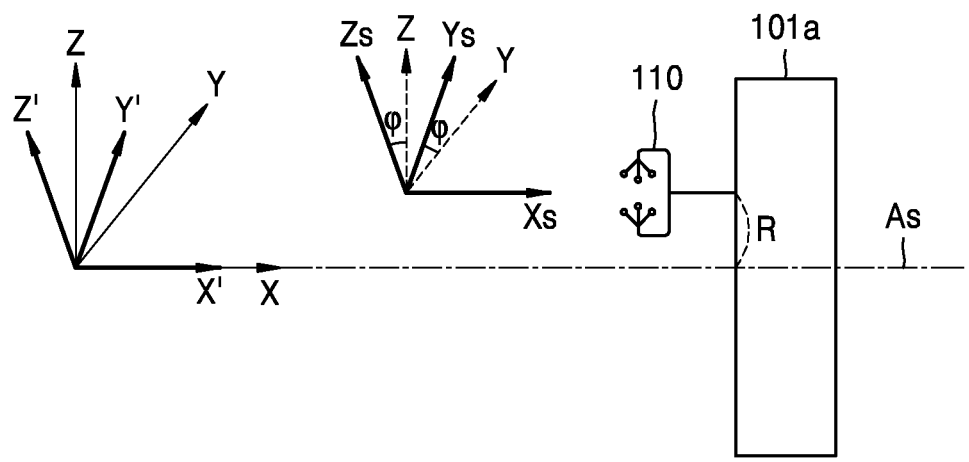
FIGS. 6A and 6B illustrate the relationship between a sensing coordinate system and a rotating coordinate system depending on the position of an ultrasonic sensor according to another embodiment.
Figure 6B:
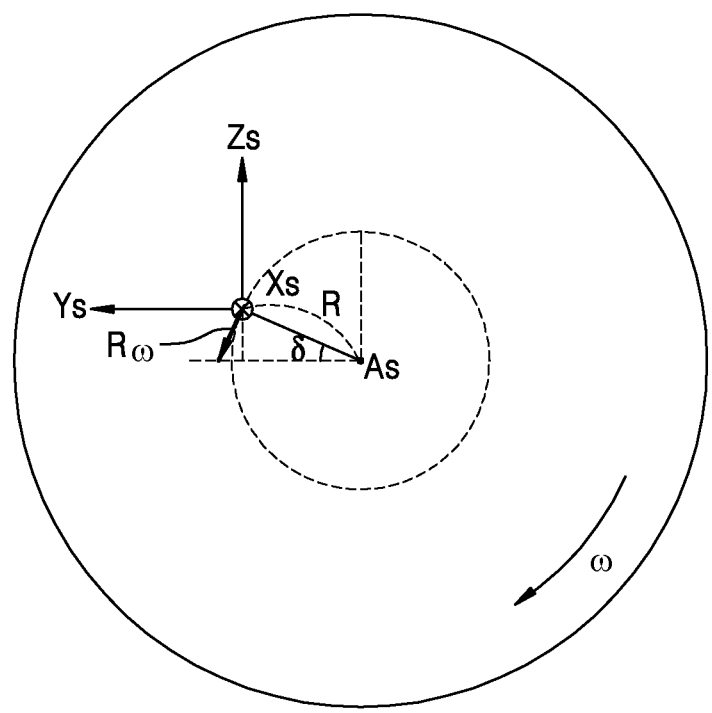

FIG. 5 is a block diagram of a coordinate converter of a 3D ultrasonic anemometer according to another embodiment. FIGS. 6A and 6B illustrate the relationship between a sensing coordinate system and a rotating coordinate system depending on the position of an ultrasonic sensor according to another embodiment.

Referring to FIG. 5 together with FIGS. 6A and 6B, a coordinate converter 130a may include a first coordinate converter 132a and a second coordinate converter 134a. The coordinate converter 130a may replace the coordinate converter 130 illustrated in FIGS. 3A and 3B.

The first coordinate converter 132a may convert a 3D sensed wind velocity (Us, Vs, Ws) on a sensing coordinate system (Xs, Ys, Zs) into a 3D rotation wind velocity (U', V', W') on a rotating coordinate system (X', Y', Z'). The second coordinate converter 134a may convert the 3D rotation wind velocity (U', V', W') on the rotating coordinate system (X', Y', Z') into a 3D fixed wind velocity (U, V, W) on a fixed coordinate system (X, Y, Z).

As illustrated in FIG. 6A, the X' axis of the rotating coordinate system (X', Y', Z') may be parallel to the X axis of the fixed coordinate system (X, Y, Z), and the Y' axis and the Z' axis of the rotating coordinate system (X', Y', Z') may be rotated by the rotation angle φ from the Y axis and the Z axis of the fixed coordinate system (X, Y, Z), respectively.

As illustrated in FIGS. 6A and 6B, due to an installation error, the ultrasonic sensor 110 may not be aligned with the rotation axis As of a rotation body 101a. That is, the ultrasonic sensor 110 may be installed on the rotation body 101a to be spaced apart from the rotation axis As by a spacing distance R. In this case, the Xs axis of the sensing coordinate system (Xs, Ys, Zs) may be spaced apart from the rotation axis As by the spacing distance R. In this case, the front surface of the rotation body 101a may be flat. Thus, the Xs axis of the sensing coordinate system (Xs, Ys, Zs) may be parallel to the rotation axis As. The rotation body 101a may rotate around the rotation axis As at an angular velocity ω.

Since the ultrasonic sensor 110 is spaced apart from the rotation axis As by the spacing distance R and the rotation body 101a rotates at the angular velocity ω, the ultrasonic sensor 110 may rotate around the rotation axis As in a circumferential direction at a velocity corresponding to the product of the spacing distance R and the angular velocity ω. Thus, even in a windless state, the ultrasonic sensor 110 may sense a relative wind velocity Rω corresponding to the product of the spacing distance R and the angular velocity ω. Since the relative wind velocity Rω may be caused by the rotation of the rotation body 101a, the relative wind velocity Rω may be subtracted from the 3D sensed wind velocity (Us, Vs, Ws) sensed in a windy state.

Since there may be no wind velocity sensed in the windless state, the sensed wind velocity may correspond to the relative wind velocity Rω caused by the rotation. Thus, the magnitude of the 3D sensed wind velocity (Us, Vs, Ws) in the windless state, that is, $(Us^2+Vs^2+Ws^2)^{1/2}$, may be the same as the relative wind velocity Rω. Thus, when the rotation body 101 is rotated at the angular velocity ω in the windless state, the spacing distance R may be calculated by dividing the magnitude of the 3D sensed wind velocity (Us, Vs, Ws) by the angular velocity ω.

In the windless state, since the first sensed wind velocity Us in the Xs-axis direction in the 3D sensed wind velocity (Us, Vs, Ws) is perpendicular to the circumferential direction, it may not be affected by the rotation of the rotation body 101a. Thus, the first sensed wind velocity Us may be 0. The second sensed wind velocity Vs in the Ys-axis direction and the third sensed wind velocity Ws in the Zs-axis direction may represent the relative wind velocity Rω caused by the rotation of the rotation body 101.

Since the ultrasonic sensor 110 may fail to be aligned with the rotation axis As due to an installation error, the direction of the spacing distance R of the ultrasonic sensor 110 may be at a particular angle between the Ys axis and the Zs axis of the sensing coordinate system (Xs, Ys, Zs). The particular angle may be represented as a spacing angle δ. As illustrated in FIG. 6B, the spacing angle δ may be defined as an angle toward the Zs axis with respect to the Ys axis of the sensing coordinate system (Xs, Ys, Zs).

In this case, as illustrated in FIG. 6B, when the rotation body 101 rotates at the angular velocity ω in the windless state, the first sensed wind velocity Us may be 0, the second sensed wind velocity Vs may correspond to Rω sin(δ), and the third sensed wind velocity Ws may correspond to −Rω cos(δ). Even when the rotation body 101 rotates at the angular velocity ω, since the spacing angle δ is defined based on the sensing coordinate system (Xs, Ys, Zs) rotating together with the rotation body 101, the spacing angle δ may not change and the second sensed wind velocity Vs and the third sensed wind velocity Ws may have a constant value in the case of the windless state. By using this fact, the spacing angle δ may be calculated based on the second sensed wind velocity Vs and the third sensed wind velocity Ws that are sensed in the windless state. For example, the spacing angle δ may be calculated as $\tan^{-1}(-Vs/Ws)$.

As described above, when the ultrasonic sensor 110 is installed apart from the rotation axis As by the spacing distance R, the 3D rotation wind velocity (U', V', W') on the rotating coordinate system (X', Y', Z') may be represented by subtracting the relative wind velocity Rω caused by the spacing distance R from the 3D sensed wind velocity (Us, Vs, Ws).

Thus, the first coordinate converter 132a may calculate the 3D rotation wind velocity (U', V', W') according to [Equation 2] below based on the 3D sensed wind velocity (Us, Vs, Ws), the spacing distance R, the angular velocity ω, and the spacing angle δ.

$U'=Us$ $V'=Vs-R\omega \sin(\delta)$ $W'=Ws+R\omega \cos(\delta)$ [Equation 2]

The X' axis of the rotating coordinate system (X', Y', Z') may be parallel to the X axis of the fixed coordinate system (X, Y, Z), and the Y' axis and the Z' axis of the rotating coordinate system (X', Y', Z') may be rotated by the rotation angle φ from the Y axis and the Z axis of the fixed coordinate system (X, Y, Z), respectively.

As illustrated in FIGS. 3A, 4A, and 4B, the 3D rotation wind velocity (U', V', W') on the rotating coordinate system (X', Y', Z') may be the same as the 3D sensed wind velocity (Us, Vs, Ws) on the sensing coordinate system (Xs, Ys, Zs) of the ultrasonic sensor 110 installed in alignment with the rotational axis As. The second coordinate converter 134a may be the same as the coordinate converter 130 of FIG. 3A except that the coordinate converter 130 of FIG. 3A receives an input of the 3D rotation wind velocity (U', V', W') instead of the 3D sensed wind velocity (Us, Vs, Ws).

Thus, the second coordinate converter 134a may calculate the 3D fixed wind velocity (U, V, W) according to [Equation 3] below based on the 3D rotation wind velocity (U', V', W') and the rotation angle φ.

$U=U'$ $V=V' \cos(\varphi)-W' \sin(\varphi)$ $W=V' \sin(\varphi)+W' \cos(\varphi)$ [Equation 3]

Since the 3D ultrasonic anemometer 100 including the coordinate converter 130a may correct an installation error of the ultrasonic sensor 110, more accurate wind velocity and direction measurement may be performed. Accordingly, the rotation axis As of the hub 14 may be accurately matched to the wind direction and the power generation efficiency of the wind turbine 200 may be improved.

Figure 7:
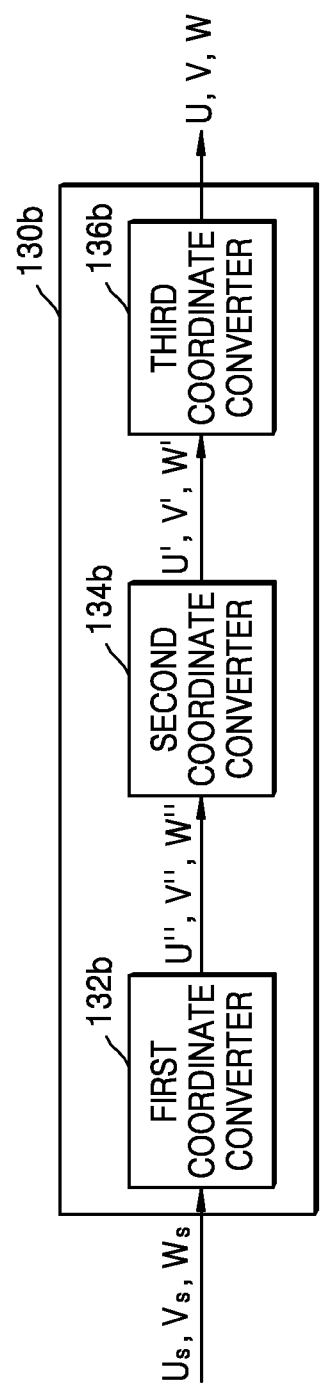
FIG. 7 is a block diagram of a coordinate converter of a 3D ultrasonic anemometer according to another embodiment.
Figure 8:
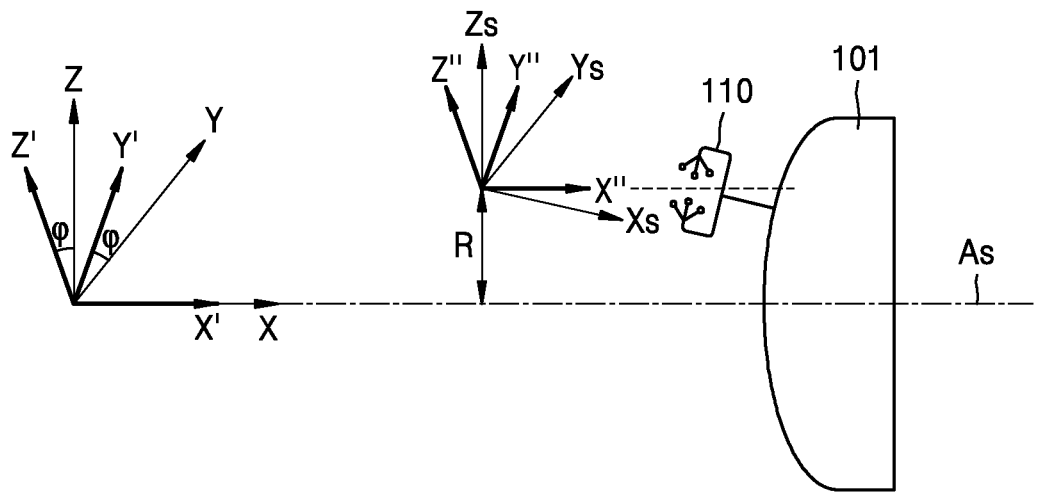
FIG. 8 illustrates the relationship between a sensing coordinate system and an offset coordinate system depending on the position of an ultrasonic sensor according to another embodiment.

FIG. 7 is a block diagram of a coordinate converter of a 3D ultrasonic anemometer according to another embodiment. FIG. 8 illustrates the relationship between a sensing coordinate system and an offset coordinate system depending on the position of an ultrasonic sensor according to another embodiment.

Referring to FIG. 7 together with FIG. 8, a coordinate converter 130b may include a first coordinate converter 132b, a second coordinate converter 134b, and a third coordinate converter 136b. The coordinate converter 130b may replace the coordinate converter 130 illustrated in FIGS. 3A and 3B.

The first coordinate converter 132b may convert a 3D sensed wind velocity (Us, Vs, Ws) on a sensing coordinate system (Xs, Ys, Zs) into a 3D offset wind velocity (U", V", W") on an offset coordinate system (X", Y", Z"). The second coordinate converter 134b may convert the 3D offset wind velocity (U", V", W") on the offset coordinate system (X", Y", Z") into a 3D rotation wind velocity (U', V', W') on a rotating coordinate system (X', Y', Z'). The third coordinate converter 136b may convert the 3D rotation wind velocity (U', V', W') on the rotating coordinate system (X', Y', Z') into a 3D fixed wind velocity (U, V, W) on a fixed coordinate system (X, Y, Z).

The X' axis of the rotating coordinate system (X', Y', Z') may be parallel to the X axis of the fixed coordinate system (X, Y, Z), and the Y' axis and the Z' axis of the rotating coordinate system (X', Y', Z') may be defined as axes rotated by the rotation angle φ from the Y axis and the Z axis of the fixed coordinate system (X, Y, Z), respectively. As illustrated in FIGS. 3A, 4A, and 4B, the rotating coordinate system (X', Y', Z') may be substantially the same as the sensing coordinate system (Xs, Ys, Zs) of the ultrasonic sensor 110 installed in alignment with the rotation axis As. Thus, as illustrated in FIGS. 3A, 4A, and 4B, the 3D rotation wind velocity (U', V', W') on the rotating coordinate system (X', Y', Z') may be the same as the 3D sensed wind velocity (Us, Vs, Ws) on the sensing coordinate system (Xs, Ys, Zs) of the ultrasonic sensor 110 installed in alignment with the rotational axis As. The third coordinate converter 136b may be the same as the coordinate converter 130 of FIG. 3A except that the coordinate converter 130 of FIG. 3A receives an input of the 3D rotation wind velocity (U', V', W) instead of the 3D sensed wind velocity (Us, Vs, Ws), and may be the same as the second coordinate converter 134a of FIG. 5.

The X" axis of the offset coordinate system (X", Y", Z") may be spaced apart from the X' axis of the rotating coordinate system (X', Y', Z') by a spacing distance R at a spacing angle δ, and the Y" axis and the Z" axis of the offset coordinate system (X", Y", Z") may defined as axes parallel to the Y' axis and the Z' axis of the rotating coordinate system (X', Y', Z'), respectively. The offset coordinate system (X", Y", Z") may be substantially the same as the sensing coordinate system (Xs, Ys, Zs) of the ultrasonic sensor 110 illustrated in FIGS. 5, 6A, and 6B. Thus, the 3D offset wind velocity (U", V", W") on the offset coordinate system (X", Y", Z") may be the same as the 3D sensed wind velocity (Us, Vs, Ws) on the sensing coordinate system (Xs, Ys, Zs) of the ultrasonic sensor 110 illustrated in FIGS. 5, 6A, and 6B.

As illustrated in FIG. 8, the ultrasonic sensor 110 may be spaced apart from the rotation axis As of the rotation body 101 by a spacing distance R, and the sensing coordinate system (Xs, Ys, Zs) of the ultrasonic sensor 110 may be a coordinate system rotated from the offset coordinate system (X", Y", Z") by first to third offset angles θx, θy, and θz according to the curvature of the front surface of the rotation body 101.

A first rotation offset coordinate system (X"x, Y"x, Z"x) may be defined as a coordinate system rotated from the offset coordinate system (X", Y", Z") by the first offset angle θx with respect to the X" axis. A second rotation offset coordinate system (X"y, Y"y, Z"y) may be defined as a coordinate system rotated from the first rotation offset coordinate system (X"x, Y"x, Z"x) by the second offset angle θy with respect to the Y"x axis. A third rotation offset coordinate system (X"z, Y"z, Z"z) may be defined as a coordinate system rotated from the second rotation offset coordinate system (X"y, Y"y, Z"y) by the third offset angle θz with respect to the Z"y axis, which may be the same as the sensing coordinate system (Xs, Ys, Zs) of the ultrasonic sensor 110. For example, the ultrasonic sensor 110 may be installed on the rotation body 101 such that the sensing coordinate system (Xs, Ys, Zs) of the ultrasonic sensor 110 may be the same as the coordinate system rotated by the third offset angle θz with respect to the third axis (e.g., the Z"y axis) of the coordinate system (e.g., the second rotation offset coordinate system (X"y, Y"y, Z"y)) rotated by the second offset angle θy with respect to the second axis (e.g., the Y"x axis) of the coordinate system (e.g., the first rotation offset coordinate system (X"x, Y"x, Z"x)) rotated by the first offset angle θx with respect to the first axis (e.g., the X" axis) of the offset coordinate system (X", Y", Z").

Thus, by coordinate system rotation conversion, the 3D offset wind velocity (U", V", W") on the offset coordinate system (X", Y", Z") and the 3D sensed wind velocity (Us, Vs, Ws) on the sensing coordinate system (Xs, Ys, Zs) may have a relationship as [Equation 4] below.

$$\begin{bmatrix} Us \\ Vs \\ Ws \end{bmatrix} = \begin{bmatrix} \cos\theta z & \sin\theta z & 0 \\ -\sin\theta z & \cos\theta z & 0 \\ 0 & 0 & 1 \end{bmatrix} \begin{bmatrix} \cos\theta y & 0 & -\sin\theta y \\ 0 & 1 & 0 \\ \sin\theta y & 0 & \cos\theta y \end{bmatrix}$$
$$\begin{bmatrix} 1 & 0 & 0 \\ 0 & \cos\theta x & \sin\theta x \\ 0 & -\sin\theta x & \cos\theta x \end{bmatrix} \begin{bmatrix} U'' \\ V'' \\ W'' \end{bmatrix}$$ [Equation 4]

When the positions of the 3D sensed wind velocity (Us, Vs, Ws) and the 3D offset wind velocity (U", V", W") are interchanged with each other in [Equation 4], a relationship as [Equation 5] may be obtained therebetween.

$$\begin{bmatrix} U'' \\ V'' \\ W'' \end{bmatrix} = \begin{bmatrix} 1 & 0 & 0 \\ 0 & \cos\theta x & -\sin\theta x \\ 0 & \sin\theta x & \cos\theta x \end{bmatrix} \begin{bmatrix} \cos\theta y & 0 & \sin\theta y \\ 0 & 1 & 0 \\ -\sin\theta y & 0 & \cos\theta y \end{bmatrix}$$
$$\begin{bmatrix} \cos\theta z & -\sin\theta z & 0 \\ \sin\theta z & \cos\theta z & 0 \\ 0 & 0 & 1 \end{bmatrix} \begin{bmatrix} Us \\ Vs \\ Ws \end{bmatrix}$$ [Equation 5]

Since there may be no wind velocity sensed in the windless state, the sensed wind velocity may be caused by the relative wind velocity Rω caused by the rotation. Thus, the magnitude of the 3D sensed wind velocity (Us, Vs, Ws) in the windless state, that is, $(Us^2+Vs^2+Ws^2)^{1/2}$, may be the same as the relative wind velocity Rω. Thus, when the rotation body 101 is rotated at the angular velocity ω in the windless state, the spacing distance R may be calculated by dividing the magnitude of the 3D sensed wind velocity (Us, Vs, Ws) by the angular velocity ω. According to another embodiment, the spacing distance R may be directly measured. Thus, when the rotation body 101 rotates at the angular velocity ω in the windless state, the 3D offset wind velocity (U", V", W") may be (0, Rω sin(δ), −Rω cos(δ)) as described above. Herein, the spacing angle δ may be defined as an angle toward the Z" axis with respect to the Y" axis of the offset coordinate system (X", Y", Z").

When the rotation body 101 rotates at the angular velocity ω in the windless state, a first offset wind velocity U" may be 0, a second offset wind velocity V" may be Rω sin(δ), and a third offset wind velocity W' may be −Rω cos(δ). Even when the rotation body 101 rotates, since the spacing angle δ is defined based on the offset coordinate system (X", Y", Z") rotating together with the rotation body 101, the spacing angle δ may not change. According to an embodiment, the spacing angle δ may be directly measured from the center of the rotation body 101.

According to another embodiment, the spacing angle δ may be preset. For example, the spacing angle δ may be set to 90 degrees. In this case, when the rotation body 101 rotates at the angular velocity ω in the windless state, the 3D offset wind velocity (U", V", W") may be (0, Rω, 0). When the spacing angle δ is preset, the Y" axis and the Z" axis of the offset coordinate system (X", Y", Z") may be determined based on the preset spacing angle δ according to the definition of the spacing angle δ.

Since all of the spacing distance R, the angular velocity ω, and the spacing angle δ may be known as described above, the 3D offset wind velocity (U", V", W") in the case where the rotation body 101 rotates at the angular velocity ω in the windless state may be known as (0, Rω sin(δ), −Rω cos(δ)).

In this case, when the 3D sensed wind velocity (Us, Vs, Ws) output by the signal processor 120 is received, since both the 3D offset wind velocity (U", V", W") and the 3D sensed wind velocity (Us, Vs, W's) are known, the first to third offset angles θx, θy, and θz that are three unknowns in [Equation 5] may be calculated.

For example, the first to third offset angles θx, θy, and θz may be calculated according to [Equation 6] based on the spacing distance R, the angular velocity ω, the spacing angle δ, and the 3D sensed wind velocity (Us, Vs, Ws) measured in the windless state.

$$\begin{bmatrix} 0 \\ R\omega\sin\delta \\ -R\omega\cos\delta \end{bmatrix} = \begin{bmatrix} 1 & 0 & 0 \\ 0 & \cos\theta x & -\sin\theta x \\ 0 & \sin\theta x & \cos\theta x \end{bmatrix} \begin{bmatrix} \cos\theta y & 0 & \sin\theta y \\ 0 & 1 & 0 \\ -\sin\theta y & 0 & \cos\theta y \end{bmatrix}$$
$$\begin{bmatrix} \cos\theta z & -\sin\theta z & 0 \\ \sin\theta z & \cos\theta z & 0 \\ 0 & 0 & 1 \end{bmatrix} \begin{bmatrix} Us \\ Vs \\ Ws \end{bmatrix}$$ [Equation 6]

Thus, the first coordinate converter 132b may calculate the 3D offset wind velocity (U", V", W") according to [Equation 5] based on the 3D sensed wind velocity (Us, Vs, Ws) and the first to third offset angles θx, θy, and θz.

As described above, the offset coordinate system (X", Y", Z") may be substantially the same as the sensing coordinate system (Xs, Ys, Zs) of the ultrasonic sensor 110 illustrated in FIGS. 5, 6A, and 6B. Thus, the 3D offset wind velocity (U", V", W") on the offset coordinate system (X", Y", Z")

may be the same as the 3D sensed wind velocity (Us, Vs, Ws) on the sensing coordinate system (Xs, Ys, Zs) of the ultrasonic sensor 110 illustrated in FIGS. 5, 6A, and 6B. The second coordinate converter 134b may be the same as the first coordinate converter 132a of FIG. 5 except that the first coordinate converter 132a of FIG. 5 receives an input of the 3D offset wind velocity (U", V", W") instead of the 3D sensed wind velocity (Us, Vs, Ws).

Thus, the second coordinate converter 134b may calculate the 3D rotation wind velocity (U', V', W') according to [Equation 7] based on the 3D offset wind velocity (U", V", W") and the spacing angle δ.

$$U'=U''$$

$$V'=V''-R\omega \sin(\delta)$$

$$W'=W''+R\omega \cos(\delta) \qquad \text{[Equation 7]}$$

Meanwhile, as described above, the third coordinate converter 136b may be the same as the coordinate converter 130 of FIG. 3A except that the coordinate converter 130 of FIG. 3A receives an input of the 3D rotation wind velocity (U', V', W') instead of the 3D sensed wind velocity (Us, Vs, Ws), and may be the same as the second coordinate converter 134a of FIG. 5.

Thus, the third coordinate converter 136b may calculate the 3D fixed wind velocity (U, V, W) according to [Equation 8] based on the 3D rotation wind velocity (U', V', W') and the rotation angle φ.

$$U=U'$$

$$V=V' \cos(\varphi) - W' \sin(\varphi)$$

$$W=V' \sin(\varphi) + W' \cos(\varphi) \qquad \text{[Equation 8]}$$

Even when the ultrasonic sensor 110 is installed to be inclined and spaced apart on the rotation body 101, since the 3D ultrasonic anemometer 100 including the coordinate converter 130b may correct such an installation error, more accurate wind velocity and direction measurement may be performed. Accordingly, the rotation axis As of the hub 14 may be accurately matched to the wind direction and the power generation efficiency of the wind turbine 200 may be improved.

According to an embodiment, a 3D wind velocity measuring method may include an operation of receiving a 3D sensed wind velocity (Us, Vs, Ws) on a sensing coordinate system (Xs, Ys, Zs), which is sensed by a 3D ultrasonic anemometer that is installed at a rotation body 101 rotating around a rotation axis As and rotates around the rotation axis As together with the rotation body 101, an operation of receiving a rotation angle φ of the rotation body, and an operation of converting the 3D sensed wind velocity (Us, Vs, Ws) on the sensing coordinate system (Xs, Ys, Zs) into a 3D fixed wind velocity (U, V, W) on a fixed coordinate system (X, Y, Z) by using the rotation angle φ. Herein, the 3D ultrasonic anemometer may be different from the 3D ultrasonic anemometers 100 and 100a of FIGS. 3A and 3B, and it may not include the coordinate converter 130 and may include the ultrasonic sensor 110 and the signal processor 120. Thus, the 3D ultrasonic anemometer may sense and output the 3D sensed wind velocity (Us, Vs, Ws) on the sensing coordinate system (Xs, Ys, Zs).

The X axis of the fixed coordinate system (X, Y, Z) may be in the same direction as the rotation axis As, and the X axis, the Y axis, and the Z axis of the fixed coordinate system (X, Y, Z) may be perpendicular to each other. In this case, the Y axis of the fixed coordinate system (X, Y, Z) may be in a direction perpendicular to the rotation axis As and the vertical axis 11. The rotation axis As may be in a direction approximately perpendicular to the direction of gravity.

For example, as illustrated in FIGS. 4A and 4B, when the Xs axis of the sensing coordinate system (Xs, Ys, Zs) is located on the rotation axis As, the 3D fixed wind velocity (U, V, W) may be calculated according to [Equation 1] based on the 3D sensed wind velocity (Us, Vs, Ws) and rotation angle φ.

According to an embodiment, the operation of converting the 3D sensed wind velocity (Us, Vs, Ws) into the 3D fixed wind velocity (U, V, W) may include an operation of converting the 3D sensed wind velocity (Us, Vs, Ws) on the sensing coordinate system (Xs, Ys, Zs) into a 3D rotation wind velocity (U', V', W') on a rotating coordinate system (X', Y', Z') and an operation of converting the 3D rotation wind velocity (U', V', W') on the rotating coordinate system (X', Y', Z') into the 3D fixed wind velocity (U, V, W) on the fixed coordinate system (X, Y, Z). In this case, the X' axis of the rotating coordinate system (X', Y', Z') may be parallel to the X axis of the fixed coordinate system (X, Y, Z), and the Y' axis and the Z' axis of the rotating coordinate system (X', Y', Z') may be axes rotated by the rotation angle φ from the Y axis and the Z axis of the fixed coordinate system (X, Y, Z), respectively.

For example, as illustrated in FIGS. 6A and 6B, when the Xs axis of the sensing coordinate system (Xs, Ys, Zs) is spaced apart from the rotation axis As by a spacing distance R at a spacing angle δ and the rotation body 101a rotates around the rotation axis As at an angular velocity ω, the 3D rotation wind velocity (U', V', W') may be calculated according to [Equation 2] based on the 3D sensed wind velocity (Us, Vs, Ws) and the spacing angle δ. The spacing angle δ may be defined as an angle toward the Zs axis with respect to the Ys axis of the sensing coordinate system (Xs, Ys, Zs). Also, the 3D fixed wind velocity (U, V, W) may be calculated according to [Equation 3] based on the 3D rotation wind velocity (U', V', W') and the rotation angle φ.

According to an embodiment, the operation of converting the 3D sensed wind velocity (Us, Vs, Ws) into the 3D fixed wind velocity (U, V, W) may include an operation of converting the 3D sensed wind velocity (Us, Vs, Ws) on the sensing coordinate system (Xs, Ys, Zs) into a 3D offset wind velocity (U", V", W") on an offset coordinate system (X", Y", Z"), an operation of converting the 3D offset wind velocity (U", V", W") on the offset coordinate system (X", Y", Z") into a 3D rotation wind velocity (U', V', W') on a rotating coordinate system (X', Y', Z'), and an operation of converting the 3D rotation wind velocity (U', V', W') on the rotating coordinate system (X', Y', Z') into the 3D fixed wind velocity (U, V, W) on the fixed coordinate system (X, Y, Z). In this case, the X" axis of the offset coordinate system (X", Y", Z") may be spaced apart from the X' axis of the rotating coordinate system (X', Y', Z') by a spacing distance R at a spacing angle δ, and the Y" axis and the Z" axis of the offset coordinate system (X", Y", Z") may be parallel to the Y' axis and the Z' axis of the rotating coordinate system (X', Y', Z'), respectively. The X' axis of the rotating coordinate system (X', Y', Z') may be parallel to the X axis of the fixed coordinate system (X, Y, Z), and the Y' axis and the Z' axis of the rotating coordinate system (X', Y', Z') may be axes rotated by the rotation angle φ from the Y axis and the Z axis of the fixed coordinate system (X, Y, Z), respectively.

For example, as illustrated in FIG. 8, when the sensing coordinate system (Xs, Ys, Zs) is the same as the coordinate system rotated by the third offset angle θz with respect to the third axis (e.g., the Z"y axis) of the coordinate system (e.g., the second rotation offset coordinate system (X"y, Y"y, Z"y)) rotated by the second offset angle θy with respect to the second axis (e.g., the Y"x axis) of the coordinate system (e.g., the first rotation offset coordinate system (X"x, Y"x, Z"x)) rotated by the first offset angle θx with respect to the first axis (e.g., the X" axis) of the offset coordinate system (X", Y", Z"), the 3D offset wind velocity (U", V", W") may be calculated according to [Equation 5] based on the 3D sensed wind velocity (Us, Vs, Ws) and the first to third offset angles θx, θy, and θz. The 3D rotation wind velocity (U', V', W') may be calculated according to [Equation 7] based on the 3D offset wind velocity (U", V", W") and the spacing angle δ. In this case, the rotation body 101 may rotate around the rotation axis As at an angular velocity ω, and the spacing angle δ may be defined as an angle toward the Zs axis with respect to the Ys axis of the sensing coordinate system (Xs, Ys, Zs). The 3D fixed wind velocity (U, V, W) may be calculated according to [Equation 8] based on the 3D rotation wind velocity (U', V', W') and the rotation angle φ.

Unless expressly stated or contradicted by the respective operations constituting the method of the present disclosure, the respective operations may be performed in any suitable order. The present disclosure is not limited to the stated order of the respective operations. All examples or example terms (e.g., "such as") provided herein are merely used to describe the present disclosure in detail, and the scope of the present disclosure is not limited by the examples or example terms unless otherwise claimed. Also, those of ordinary skill in the art will understand that design conditions and factors may be modified within the scope of the claims or equivalents thereof.

Thus, the spirit and scope of the present disclosure should not be limited to the above embodiments, and the scope of the present disclosure may include both the following claims and the equivalents thereof.

INDUSTRIAL APPLICABILITY

The present disclosure relates to a 3D ultrasonic anemometer mounted on a rotation body to rotate and a 3D wind velocity measuring method using the same, and is industrially applicable because it may be applied to, for example, wind turbines.

The invention claimed is:

1. A three-dimensional (3D) ultrasonic anemometer comprising:
an ultrasonic sensor comprising three pairs of ultrasonic transceivers arranged in different directions, wherein the ultrasonic sensor is installed at a rotation body rotating around a rotation axis and rotates around the rotation axis together with the rotation body;
a signal processor outputting a 3D sensed wind velocity sensed by the ultrasonic sensor; and
a coordinate converter converting the 3D sensed wind velocity into a 3D fixed wind velocity on a fixed coordinate system by using a rotation angle φ of the rotation body.

2. The 3D ultrasonic anemometer of claim 1, further comprising a rotation angle sensor comprising a gravity sensor rotating together with the rotation body, wherein the rotation angle sensor senses the rotation angle φ of the rotation body by using the gravity sensor and outputs the rotation angle φ to the coordinate converter.

3. The 3D ultrasonic anemometer of claim 1, wherein the coordinate converter receives, in real time, information about the rotation angle φ of the rotation body from an external device including the rotation body.

4. The 3D ultrasonic anemometer of claim 1, wherein the 3D sensed wind velocity is defined on a sensing coordinate system of the ultrasonic sensor, and
an X axis of the fixed coordinate system is in the same direction as the rotation axis, and the X axis, a Y axis, and a Z axis of the fixed coordinate system are perpendicular to each other.

5. The 3D ultrasonic anemometer of claim 4, wherein, when the ultrasonic sensor is aligned on the rotation axis such that an Xs axis of the sensing coordinate system is arranged on the rotation axis,
the coordinate converter calculates the 3D fixed wind velocity according to [Equation] below based on the 3D sensed wind velocity and the rotation angle φ

$U = Us$ $V = Vs \cos(\varphi) - Ws \sin(\varphi)$ $W = Vs \sin(\varphi) + Ws \cos(\varphi)$ [Equation].

6. The 3D ultrasonic anemometer of claim 4, wherein the coordinate converter comprises:
a first coordinate converter converting the 3D sensed wind velocity on the sensing coordinate system into a 3D rotation wind velocity on a rotating coordinate system; and
a second coordinate converter converting the 3D rotation wind velocity on the rotating coordinate system into the 3D fixed wind velocity on the fixed coordinate system,
wherein an X' axis of the rotating coordinate system is parallel to the X axis of the fixed coordinate system, and a Y' axis and a Z' axis of the rotating coordinate system are rotated by the rotation angle φ from the Y axis and the Z axis of the fixed coordinate system, respectively.

7. The 3D ultrasonic anemometer of claim 6, wherein, when the ultrasonic sensor is installed on the rotation body such that an Xs axis of the sensing coordinate system is spaced apart from the rotation axis by a spacing distance R at a spacing angle δ, and the rotation body rotates around the rotation axis at an angular velocity ω,
the first coordinate converter calculates the 3D rotation wind velocity according to [Equation] below based on the 3D sensed wind velocity and the spacing angle δ,
wherein the spacing angle δ is defined as an angle toward a Zs axis with respect to a Ys axis of the sensing coordinate system $U' = Us$ $V' = Vs - R\omega \sin(\delta)$ $W' = Ws + R\omega \cos(\delta)$ [Equation].

8. The 3D ultrasonic anemometer of claim 7, wherein the first coordinate converter calculates the angular velocity ω based on the rotation angle φ of the rotation body.

9. The 3D ultrasonic anemometer of claim 7, wherein the spacing distance R is calculated by dividing a magnitude of the 3D sensed wind velocity in a windless state by the angular velocity ω.

10. The 3D ultrasonic anemometer of claim 7, wherein the spacing angle δ is calculated as tan−1(−Vs/Ws) based on the 3D sensed wind velocity in a windless state.

11. The 3D ultrasonic anemometer of claim 7, wherein the second coordinate converter calculates the 3D fixed wind velocity according to [Equation] below based on the 3D rotation wind velocity and the rotation angle φ

$U=U'$ $V=V'\cos(\varphi)-W'\sin(\varphi)$ $W=V'\sin(\varphi)+W'\cos(\varphi)$ [Equation].

12. The 3D ultrasonic anemometer of claim 4, wherein the coordinate converter comprises:
   a first coordinate converter converting the 3D sensed wind velocity on the sensing coordinate system into a 3D offset wind velocity on an offset coordinate system;
   a second coordinate converter converting the 3D offset wind velocity on the offset coordinate system into a 3D rotation wind velocity on a rotating coordinate system; and
   a third coordinate converter converting the 3D rotation wind velocity on the rotating coordinate system into the 3D fixed wind velocity on the fixed coordinate system,
   wherein an X" axis of the offset coordinate system is spaced apart from an X' axis of the rotating coordinate system by a spacing distance R at a spacing angle δ, and a Y" axis and a Z" axis of the offset coordinate system are parallel to a Y' axis and a Z' axis of the rotating coordinate system, respectively, and
   the X' axis of the rotating coordinate system is parallel to the X axis of the fixed coordinate system, and the Y' axis and the Z' axis of the rotating coordinate system are rotated by the rotation angle φ from the Y axis and the Z axis of the fixed coordinate system, respectively.

13. The 3D ultrasonic anemometer of claim 12, wherein, when the ultrasonic sensor is installed on the rotation body such that the sensing coordinate system is the same as a coordinate system rotated by a third offset angle θz with respect to a third axis of a coordinate system rotated by a second offset angle θy with respect to a second axis of a coordinate system rotated by a first offset angle θx with respect to a first axis of the offset coordinate system, and the rotation body rotates around the rotation axis at an angular velocity ω,
   the first coordinate converter calculates the 3D offset wind velocity according to [Equation] below based on the 3D sensed wind velocity and the first to third offset angles θx, θy, and θz $$\begin{bmatrix} U'' \\ V'' \\ W'' \end{bmatrix} = \begin{bmatrix} 1 & 0 & 0 \\ 0 & \cos\theta x & -\sin\theta x \\ 0 & \sin\theta x & \cos\theta x \end{bmatrix} \begin{bmatrix} \cos\theta y & 0 & \sin\theta y \\ 0 & 1 & 0 \\ -\sin\theta y & 0 & \cos\theta y \end{bmatrix}$$

$$\begin{bmatrix} \cos\theta z & -\sin\theta z & 0 \\ \sin\theta z & \cos\theta z & 0 \\ 0 & 0 & 1 \end{bmatrix} \begin{bmatrix} Us \\ Vs \\ Ws \end{bmatrix}.$$

[Equation]

14. The 3D ultrasonic anemometer of claim 13, wherein the first to third offset angles θx, θy, and θz are calculated according to [Equation] below based on the spacing distance R, the angular velocity ω, the spacing angle δ, and the 3D sensed wind velocity measured in a windless state, and
   the spacing angle δ is defined as an angle toward the Z" axis with respect to the Y" axis of the offset coordinate system $$\begin{bmatrix} 0 \\ R\omega\sin\delta \\ -R\omega\cos\delta \end{bmatrix} = \begin{bmatrix} 1 & 0 & 0 \\ 0 & \cos\theta x & -\sin\theta x \\ 0 & \sin\theta x & \cos\theta x \end{bmatrix} \begin{bmatrix} \cos\theta y & 0 & \sin\theta y \\ 0 & 1 & 0 \\ -\sin\theta y & 0 & \cos\theta y \end{bmatrix}$$

-continued $$\begin{bmatrix} \cos\theta z & -\sin\theta z & 0 \\ \sin\theta z & \cos\theta z & 0 \\ 0 & 0 & 1 \end{bmatrix} \begin{bmatrix} Us \\ Vs \\ Ws \end{bmatrix}.$$

15. The 3D ultrasonic anemometer of claim 12, wherein the second coordinate converter calculates the 3D rotation wind velocity according to [Equation 1] below based on the 3D offset wind velocity and the spacing angle δ,
   the third coordinate converter calculates the 3D fixed wind velocity according to [Equation 2] below based on the 3D rotation wind velocity and the rotation angle φ, and
   the spacing angle δ is defined as an angle toward a Zs axis with respect to a Ys axis of the sensing coordinate system $U'=U''$ $V'=V''-R\omega\sin(\delta)$ $W'=W''+R\omega\cos(\delta)$ [Equation 1]

$U=U'$ $V=V'\cos(\varphi)-W'\sin(\varphi)$ $W=V'\sin(\varphi)+W'\cos(\varphi)$ [Equation 2].

16. A three-dimensional (3D) wind velocity measuring method comprising:
   receiving a 3D sensed wind velocity on a sensing coordinate system, which is sensed by a 3D ultrasonic anemometer that is installed at a rotation body rotating around a rotation axis and rotates around the rotation axis together with the rotation body;
   receiving a rotation angle φ of the rotation body; and
   converting the 3D sensed wind velocity on the sensing coordinate system into a 3D fixed wind velocity on a fixed coordinate system by using the rotation angle φ.

17. The 3D wind velocity measuring method of claim 16, wherein an X axis of the fixed coordinate system is in the same direction as the rotation axis, and the X axis, a Y axis, and a Z axis of the fixed coordinate system are perpendicular to each other.

18. The 3D wind velocity measuring method of claim 17, wherein, when an Xs axis of the sensing coordinate system is located on the rotation axis,
   in the converting of the 3D sensed wind velocity into the 3D fixed wind velocity,
   the 3D fixed wind velocity is calculated according to [Equation] below based on the 3D sensed wind velocity and the rotation angle φ

$U=Us$ $V=Vs\cos(\varphi)-Ws\sin(\varphi)$ $W=Vs\sin(\varphi)+Ws\cos(\varphi)$ [Equation].

19. The 3D wind velocity measuring method of claim 17, wherein the converting of the 3D sensed wind velocity into the 3D fixed wind velocity comprises:
   converting the 3D sensed wind velocity on the sensing coordinate system into a 3D rotation wind velocity on a rotating coordinate system; and
   converting the 3D rotation wind velocity on the rotating coordinate system into the 3D fixed wind velocity on the fixed coordinate system, wherein an X' axis of the rotating coordinate system is parallel to the X axis of the fixed coordinate system, and a Y' axis and a Z' axis of the rotating coordinate system are rotated by the rotation angle φ from the Y axis and the Z axis of the fixed coordinate system, respectively.

20. The 3D wind velocity measuring method of claim 19, wherein, when an Xs axis of the sensing coordinate system is spaced apart from the rotation axis by a spacing distance R at a spacing angle δ and the rotation body rotates around the rotation axis at an angular velocity ω, the 3D rotation wind velocity is calculated according to [Equation 1] below based on the 3D sensed wind velocity and the spacing angle δ, and the 3D fixed wind velocity is calculated according to [Equation 2] below based on the 3D rotation wind velocity and the rotation angle φ, wherein the spacing angle δ is defined as an angle toward a Zs axis with respect to a Ys axis of the sensing coordinate system $U'=Us$ $V'=Vs-R\omega \sin(\delta)$ $W'=Ws+R\omega \cos(\delta)$ [Equation 1]

$U=U'$ $V=V' \cos(\varphi)-W' \sin(\varphi)$ $W=V' \sin(\varphi)+W' \cos(\varphi)$ [Equation 2].

21. The 3D wind velocity measuring method of claim 17, wherein the converting of the 3D sensed wind velocity into the 3D fixed wind velocity comprises:

converting the 3D sensed wind velocity on the sensing coordinate system into a 3D offset wind velocity on an offset coordinate system;

converting the 3D offset wind velocity on the offset coordinate system into a 3D rotation wind velocity on a rotating coordinate system; and converting the 3D rotation wind velocity on the rotating coordinate system into the 3D fixed wind velocity on the fixed coordinate system, wherein an X" axis of the offset coordinate system is spaced apart from an X' axis of the rotating coordinate system by a spacing distance R at a spacing angle δ, and a Y" axis and a Z" axis of the offset coordinate system are parallel to a Y' axis and a Z' axis of the rotating coordinate system, respectively, and the X' axis of the rotating coordinate system is parallel to the X axis of the fixed coordinate system, and the Y' axis and the Z' axis of the rotating coordinate system are rotated by the rotation angle φ from the Y axis and the Z axis of the fixed coordinate system, respectively.

22. The 3D wind velocity measuring method of claim 21, wherein, when the sensing coordinate system is the same as a coordinate system rotated by a third offset angle θz with respect to a third axis of a coordinate system rotated by a second offset angle θy with respect to a second axis of a coordinate system rotated by a first offset angle θx with respect to a first axis of the offset coordinate system and the rotation body rotates around the rotation axis at an angular velocity ω, the 3D offset wind velocity is calculated according to [Equation 1] below based on the 3D sensed wind velocity and the first to third offset angles θx, θy, and θz, the 3D rotation wind velocity is calculated according to [Equation 2] below based on the 3D offset wind velocity and the spacing angle δ, and the 3D fixed wind velocity is calculated according to [Equation 3] below based on the 3D rotation wind velocity and the rotation angle φ, wherein the spacing angle δ is defined as an angle toward a Zs axis with respect to a Ys axis of the sensing coordinate system $$\begin{bmatrix} U'' \\ V'' \\ W'' \end{bmatrix} = \begin{bmatrix} 1 & 0 & 0 \\ 0 & \cos\theta x & -\sin\theta x \\ 0 & \sin\theta x & \cos\theta x \end{bmatrix} \begin{bmatrix} \cos\theta y & 0 & \sin\theta y \\ 0 & 1 & 0 \\ -\sin\theta y & 0 & \cos\theta y \end{bmatrix}$$ [Equation 1]

$$\begin{bmatrix} \cos\theta z & -\sin\theta z & 0 \\ \sin\theta z & \cos\theta z & 0 \\ 0 & 0 & 1 \end{bmatrix} \begin{bmatrix} Us \\ Vs \\ Ws \end{bmatrix}$$

$U' = U''$ [Equation 2]

$V' = V'' - R\omega\sin(\delta)$ $W' = W'' + R\omega\cos(\delta)$ $U = U'$ [Equation 3]

$V = V'\cos(\varphi) - W'\sin(\varphi)$ $W = V'\sin(\varphi) + W'\cos(\varphi)$.

23. A wind turbine comprising:

a hub rotating along a rotation axis;

rotation blades installed at the hub to rotate the hub by wind power;

a nacelle generating electricity by the rotation of the hub;

a three-dimensional (3D) ultrasonic anemometer outputting a 3D fixed wind velocity on a fixed coordinate system; and a controller controlling at least one of a pitch angle of the rotation blades and a yaw angle of the rotation axis by using the 3D fixed wind velocity, wherein the 3D ultrasonic anemometer comprises:

an ultrasonic sensor comprising three pairs of ultrasonic transceivers arranged in different directions, wherein the ultrasonic sensor is installed at a spinner of the hub rotating around the rotation axis and rotates around the rotation axis together with the hub;

a signal processor outputting a 3D sensed wind velocity on a sensing coordinate system sensed by the ultrasonic sensor; and a coordinate converter converting the 3D sensed wind velocity into the 3D fixed wind velocity by using a rotation angle φ of the hub.

* * * * *